Patented Feb. 27, 1934

1,949,209

UNITED STATES PATENT OFFICE 1,949,209

BROMINATION PRODUCTS OF THE DIBENZANTHRONE SERIES

Max Albert Kunz, Mannheim, and Karl Koeberle, Ludwigshafen - on - the - Rhine, Germany, assignors to General Aniline Works, Inc., New York, N. Y., a corporation of Delaware No Drawing. Application August 20, 1932, Serial No. 629,752. In Germany March 13, 1928

6 Claims. (Cl. 260—61)

The present invention relates to new bromination products of the dibenzanthrone series.

We have found that brominated products of the dibenzanthrone series are readily obtained by acting on a "dibenzanthrone substance" by which term we mean dibenzanthrone and isodibenzanthrone, with bromine or agents furnishing the same in a sulphuric acid which expression is to be understood as comprising concentrated sulphuric acid, oleum and chlorosulphonic acid, in the presence of a halogen carrier. The temperature at which the bromination is to be carried out depends on the kind of sulphuric acid employed, on the degree of bromination to be obtained, the amount of bromine taken, and on the specific halogen carrier employed. It should, however, be kept in mind that at higher temperatures sulphonation of the dibenzanthrones and even oxidation thereof occurs which side reactions, however, are avoided with certainty when raising the temperature not above 90° C. As halogen carriers those usually employed in halogenation processes are suitable, for instance, iodine, sulphur, selenium, iron, manganese, nickel, molybdenum, arsenic, bismuth, mercury and antimony. As stated above the number of bromine atoms entering each molecule of the initial material depends not only on the temperature and the amount of bromine employed, but also to a large extent on the specific halogen carrier; in some cases it is advisable to carry out the bromination in the presence of two or more halogen carriers.

When carrying out the bromination in chlorosulphonic acid, products are obtained which in most cases contain chlorine besides bromine, in particular when carrying out the process above 50° C., but also at lower temperatures chlorination takes place in most cases, but the proportion of chlorine and bromine entering the molecule is changed in favour of bromine. Here too, the degree of chlorination and the proportion of bromine and chlorine entering the molecule of the dibenzanthrone largely depend on the halogen carrier used. Only when brominating in chlorosulphonic acid in the presence of antimony, practically no chlorination takes place even at higher temperatures.

The brominated dibenzanthrones of which excellent yields are obtained and in a pure state, constitute dyestuffs possessing valuable properties, especially those produced in chlorosulphonic acid, dyeing the vegetable fibre strong, usually blue to violet shades, extremely fast to chlorine. The dyeings obtained from the dyestuffs prepared under mild conditions as regards the temperature are still more fast to washing and bucking than those of the products obtained at higher temperatures. The products may be purified, if desired, by recrystallization from organic solvents, or by dissolving them in concentrated sulphuric acid and reprecipitating them by diluting the solution with water, or by treating them with oxidizing agents, for example with an alkaline sodium hypochlorite solution.

The following examples will further illustrate the nature of the invention which, however, is not limited to these examples. The parts are by weight.

*Example 1*

46 parts of pure isodibenzanthrone are dissolved in 460 parts of chlorosulphonic acid at ordinary temperature, while stirring; after the addition of 4 parts of antimony 35 parts of bromine are introduced into the reaction mixture, the temperature of which is slowly raised to between 60° and 70° C. and maintained at this temperature until the bulk of the bromine is taken up. The reaction mixture is then allowed to cool, diluted with concentrated sulphuric acid and poured onto ice, the resulting precipitate being filtered by suction, washed until neutral and dried. The reaction product obtained is a blue violet powder, which dissolves in concentrated sulphuric acid to give a yellow green solution and which dyes cotton from a blue vat in clear very fast blue violet shades.

The dibenzanthrone derivative produced in an analogous manner dyes cotton in very fast strong pure blue shades.

*Example 2*

46 parts of dibenzanthrone are dissolved in 460 parts of 96 per cent sulphuric acid. 40 parts of bromine are introduced at ordinary temperature into the said solution, to which 2 parts of sulphur have been added. The reaction mixture is then warmed to between 40° and 50° C. and stirred until all of the bromine has been consumed. After cooling, the reaction mixture is worked up as usual. The brominated dyestuff containing 3 atoms of bromine per molecule is a violet blue powder, dissolving in violet solution in concentrated sulphuric acid and dyeing cotton marine blue shades from a blue violet vat.

*Example 3*

35 parts of bromine are slowly introduced into a stable solution of 46 parts of pure dibenzanthrone in 460 parts of chlorosulphuric acid to which 4 parts of antimony have been added, at ordinary temperature, stirring being continued for some hours. The reaction mixture is then warmed to between 45° and 55° C. and stirring continued at the said temperature until the bromine has been taken up. After cooling, the reaction mixture is diluted with about 200 parts of concentrated sulphuric acid, poured onto ice, boiled up and the reaction product filtered by suction and washed until neutral, after washing it, if desired, with a dilute soda solution. The reaction product is a tribromodibenzanthrone dissolving to a violet solution in concentrated sulphuric acid and dyeing cotton strong marine blue shades from a blue vat with a violet tinge.

*Example 4*

46 parts of bromine are run at ordinary temperature into a solution of 46 parts of dibenzanthrone in 400 parts of chlorosulphonic acid to which 4 parts of antimony have been added, the temperature being then raised to between 65° and 70° C. and the mixture stirred until the bulk of the bromine employed is taken up. The reaction mixture is then allowed to cool and worked up as usual. The tetrabromodibenzanthrone containing small amounts of chlorine is obtained as a blue violet powder and forms a dark blue powder when dry, dissolving to a violet solution in concentrated sulphuric acid and dyeing cotton from a violet blue vat marine blue shades with a slight greenish tinge of excellent fastness.

The reaction may also be carried out at somewhat lower temperatures.

The tetrabromoisodibenzanthrone containing still less chlorine can be prepared in an analogous manner and forms a violet powder dissolving to a green solution in concentrated sulphuric acid and dyeing cotton from a blue vat excellent fast clear violet shades.

This application is a continuation in part of our copending application Ser. No. 345,880, filed March 9th, 1929, now Patent No. 1,882,285.

What we claim is:—

1. Brominated dibenzanthrone substances containing from 3 to 4 atoms of bromine per molecule, dissolving in concentrated sulphuric acid giving violet to green solutions and dyeing the vegetable fibre from blue vats blue to violet shades.

2. Brominated dibenzanthrone containing from 3 to 4 atoms of bromine per molecule, dissolving in concentrated sulphuric acid giving violet solutions and dyeing the vegetable fibre from blue vats blue shades.

3. Tribromo-dibenzanthrone, dissolving in concentrated sulphuric acid giving a violet solution and dyeing the vegetable fibre from a blue vat blue shades.

4. Tetrabromo-dibenzanthrone, dissolving in concentrated sulphuric acid giving a violet solution and dyeing the vegetable fibre from a blue vat blue shades.

5. Brominated isodibenzanthrone containing from 3 to 4 atoms of bromine per molecule, dissolving in concentrated sulphuric acid giving green solutions and dyeing the vegetable fibre from blue vats violet shades.

6. Tribromo-isodibenzanthrone, dissolving in concentrated sulphuric acid giving a green solution and dyeing the vegetable fibre from a blue vat violet shades.

MAX ALBERT KUNZ.
KARL KOEBERLE.